United States Patent [19]

Chen

[11] Patent Number: 5,169,537
[45] Date of Patent: Dec. 8, 1992

[54] WATER SOLUBLE TERPOLYMERS AND METHODS OF USE THEREOF

[75] Inventor: Fu Chen, Newtown, Pa.

[73] Assignee: Betz Laboratories, Inc., Trevose, Pa.

[21] Appl. No.: 832,562

[22] Filed: Feb. 7, 1992

Related U.S. Application Data

[62] Division of Ser. No. 670,127, Mar. 15, 1991, Pat. No. 5,128,427.

[51] Int. Cl.$^5$ .............................................. C02F 5/12
[52] U.S. Cl. ................................... 210/701; 252/180
[58] Field of Search ............................ 210/698–701; 252/180, 181

[56] References Cited

U.S. PATENT DOCUMENTS

| | | | |
|---|---|---|---|
| 3,898,037 | 8/1975 | Lange et al. | 21/2.7 R |
| 4,500,693 | 2/1985 | Takehara et al. | 526/240 |
| 4,640,793 | 2/1987 | Persinski et al. | 252/82 |
| 4,717,542 | 1/1988 | Mitchell | 422/15 |
| 4,872,995 | 10/1989 | Chen et al. | 210/699 |
| 4,895,663 | 1/1990 | Chen | 210/701 |
| 4,895,664 | 1/1990 | Chen | 210/701 |
| 4,931,188 | 6/1990 | Chen | 210/697 |
| 4,933,090 | 6/1990 | Gill et al. | 210/701 |
| 4,944,885 | 7/1990 | Chen | 210/701 |

OTHER PUBLICATIONS

Chemical Abstract 98:221593W.

Primary Examiner—Peter Hruskoci
Attorney, Agent, or Firm—Alexander D. Ricci; Gregory M. Hill

[57] ABSTRACT

A water soluble terpolymer useful in controlling deposition of scale in aqueous systems comprised of monomeric repeat units (g), (h) and (i) wherein repeat unit (g) comprises the structure $$-\!\!\left[E\right]\!\!-$$

wherein E is the repeat unit obtained after polymerization of an α,β ethylenically unsaturated compound, wherein repeat unit (h) comprises the structure

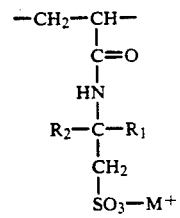

wherein $R_1$ and $R_2$ are the same or different and denote H, methyl or ethyl and M is a water soluble cation or H, and wherein repeat unit (i) comprises the structure

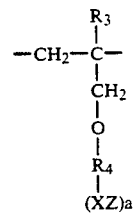

wherein $R_3$ is a lower alkyl ($C_1$–$C_3$), $R_4$ is a hydroxy substituted alkyl or alkylene group having from 1 to about 6 carbon atoms or a non-substituted alkyl or alkylene group having from 1 to about 6 carbon atoms, X is an anionic radical, Z is H, hydrogen atoms or a water soluble cation or cations which together counterbalance the valance of X and a is 0 or 1.

6 Claims, No Drawings

WATER SOLUBLE TERPOLYMERS AND METHODS OF USE THEREOF

This is a divisional of application Ser. No. 670,127, filed Mar. 15, 1991, now U.S. Pat. No. 5,128,427.

FIELD OF THE INVENTION

The present invention pertains to a composition and method of utilization of same to inhibit corrosion and control the formation and deposition of scale imparting compounds in water systems such as cooling, boiler and gas scrubbing systems.

BACKGROUND OF THE INVENTION

The problems of corrosion and scale formation and attendant effects have troubled water systems for years. For instance, scale tends to accumulate on internal walls of various water systems, such as boiler and cooling systems, and thereby materially lessens the operational efficiency of the system.

Deposits in lines, heat exchange equipment, etc., may originate from several causes. For example, precipitation of calcium carbonate, calcium sulfate and calcium phosphate in the water system leads to an accumulation of these scale imparting compounds along or around the metal surfaces which contact the flowing water circulating through the system. In this manner, heat transfer functions of the particular system are severely impeded.

Corrosion, on the other hand, is a degradative electrochemical reaction of a metal with its environment. Simply stated, it is the reversion of refined metals to their natural state. For example, iron ore is iron oxide. Iron oxide is refined into steel. When the steel corrodes, it forms iron oxide which, if unattended, may result in failure or destruction of the metal, causing the particular water system to be shut down until the necessary repairs can be made.

Typically, in cooling water systems, the formation of calcium sulfate, calcium phosphate and calcium carbonate, among others, has proven deleterious to the overall efficiency of the cooling water system. Recently, due to the popularity of cooling treatments using high levels of orthophosphate to promote passivation of the metal surfaces in contact with the system water, it has become critically important to control calcium phosphate crystallization so that relatively high levels of orthophosphate may be maintained in the system to achieve the desired passivation without resulting in fouling or impeded heat transfer functions which would normally be caused by calcium phosphate deposition.

Although steam generating systems are somewhat different from cooling water systems, they share a common problem in regard to deposit formation.

As detailed in the Betz Handbook of Industrial Water Conditioning, 8th Edition, 1980, Betz Laboratories, Inc., Trevose, Pa. Pages 85-94, the formation of scale and sludge deposits on boiler heating surfaces is a serious problem encountered in steam generation. Although current industrial steam producing systems make use of sophisticated external treatments of the boiler feed-water, e.g., coagulation filtration, softening of water prior to its feed into the boiler system, these operations are only moderately effective. In all cases, external treatment does not in itself provide adequate treatment since muds, sludge, silts and hardness imparting ions escape the treatment, and eventually are introduced into the steam generating system.

In addition to the problems caused by mud, sludge or silts, the industry has also had to contend with boiler scale. Although external treatment is utilized specifically in an attempt to remove calcium and magnesium from the feedwater, scale formation due to residual hardness, i.e., calcium and magnesium salts, is always experienced. Accordingly, internal treatment, e., treatment of the water fed to the system, is necessary to prevent, reduce and/or retard formation of the scale imparting compounds and their resultant deposition. The carbonates of magnesium and calcium are not the only problem compounds as regards scale, but also water having high contents of phosphate, sulfate and silicate ions either occurring naturally or added for other purposes cause problems since calcium and magnesium, and any iron or copper present, react with each and deposit as boiler scale. As is obvious, the deposition of scale on the structural parts of a steam generating system causes poorer circulation and lower heat transfer capacity, resulting accordingly in an overall loss in efficiency.

DESCRIPTION OF RELATED ART

U.S. Pat. Nos. 4,895,663, 4,895,664 and 4,944,885 (Chen) disclose using copolymers of acrylic acid and sodium 3-allyloxy 2-hydroxypropanesulfonate as a scale inhibitor. U.S. Pat. No. 4,500,693 (Takehara et al) discloses water soluble copolymers having an acrylic acid or methacrylic acid repeat unit which is copolymerized with certain allyl ether monomers. The polymers disclosed in accordance with Takehara et al are useful calcium carbonate inhibitors and may also be used as pigment dispersants.

Water soluble which contain 2-acrylamido-2-methyl-propanesulfonic acid (AMPS$^R$) are described in U.S. Pat. Nos. 3,898,037, 4,641,793 and 4,717,542. The copolymers are used as dispersants for particles contained in aqueous systems.

Chemical abstract 98:221593W discloses a copolymer of sodium acrylate/3-alloxy-1,2 dihydroxypropane as a scale inhibitor.

None of the aforementioned disclosures describes the specific terpolymers of the present invention.

DETAILED DESCRIPTION OF THE INVENTION

In accordance with the invention, it has been discovered that certain new water soluble terpolymers are effective in controlling the formation of mineral deposits such as scale and in inhibiting under deposit corrosion on metallic surfaces in various water systems. These polymers comprise monomeric repeat units composed of an ethylenically unsaturated compound of Formula (I)

 (I)

where E in the above formula is the repeat unit obtained after polymerization of an $\alpha, \beta$ ethylenically unsaturated compound, preferably carboxylic acid, amide form thereof, lower alkyl ($C_1$–$C_6$) ester or hydroxylated lower alkyl ($C_1$–$C_6$) ester of such carboxylic acid. Compounds encompassed by E include the repeat unit obtained after polymerization of acrylic acid, methacrylic acid, acrylamide, maleic acid or anhydride, and itaconic acid. Water soluble salt forms of the carboxylic acids are also within the purview of the invention.

The second component of the terpolymers is a sulfonate containing acrylamide based compound of Formula (II)

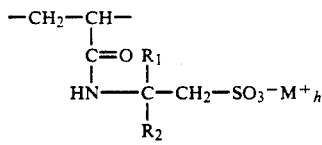

wherein $R_1$ and $R_2$ in the above formula are identical or different and denote hydrogen, methyl or ethyl groups. M is a water soluble cation (e.g., $NH_4^+$, alkali metal) or hydrogen.

The third component of the terpolymers is a substituted allyl alkylene ether compound of Formula (III).

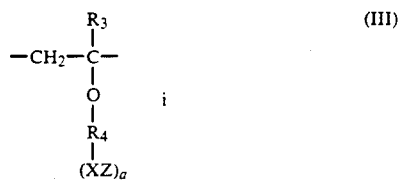

wherein $R_3$ is H or lower alkyl ($C_1$–$C_3$), $R_4$ is a hydroxy substituted alkyl or alkylene group having from 1 to about 6 carbon atoms or a non-substituted alkyl or alkylene group having from 1 to about 6 carbon atoms, X is an anionic radical (e.g., sulfonate), Z is one or more H or a water soluble cation or cations which together counterbalance the valence of X, and a is 0 or 1. The monomer (Formula III) may also be allyl glycidyl ether. The mole % (g, h, i) for each of the monomers in the terpolymer is in a random distribution to the extent of 5 to 95%. However, the sum of the components (g +h +i) is 100 mole % and the resulting terpolymer is still water soluble.

The specific preferred polymers are terpolymers of the sodium acrylate/sodium 2-acrylamido-2-methylpropanesulfonate/3-allyloxy-1,2-dihydroxypropane of Formula (IV).

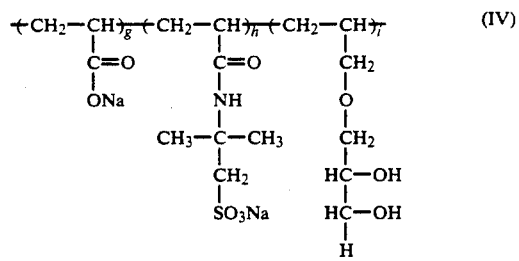

and the sodium acrylate/sodium 2-acrylamido-2- methylpropane sulfonate/sodium 3-allyloxy-2- hydroxypropanesulfonate of Formula (V)

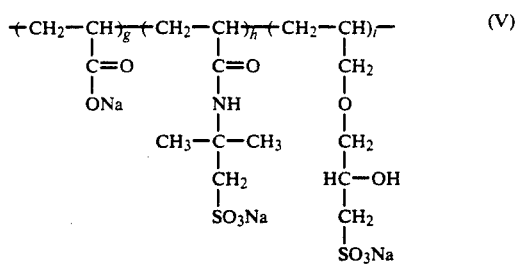

The compound, 2-acrylamido-2-methylpropanesulfonic acid (AMPS®) is commercially available from Lubrizol. 3-Allyloxyl-1, 2-dihydroxypropane is also named glyceryl allyl ether (GAE) and is commercially available from several sources. Sodium 3-allyloxy-2-hydroxypropanesulfonate (AHPS) can be purchased from Alcolac (COPS$^R$I).

The terpolymers should be added to the aqueous system, for which deposit control and corrosion inhibition activities are desired, in an amount effective for the purpose. This amount will vary depending upon the particular system for which treatment is desired and will be influenced by factors such as, the area subject to deposition, pH, temperature, water quantity and the respective concentrations in the water of the potential scale and deposit forming species. For the most part, the polymers will be effective when concentration levels are maintained at about 0.1–500 parts per million parts of water, and preferably from about 1.0 to 100 parts per million parts of water in the aqueous system to be treated. The polymers may be added directly into the desired water system in a fixed quantity and in the state of an aqueous solution, continuously or intermittently.

The polymers of the present invention are not limited to use in any specific category of water system. For instance, in addition to boiler and cooling water systems, the polymers may be effectively utilized in gas scrubber systems and the like wherein the formation and deposition of scale forming salts is a problem. Other possible environments in which the inventive polymers may be used include heat distribution type sea water desalting apparatus and dust collection systems in iron and steel manufacturing industries and as a dispersant in the pulp and paper processing industries. Also the polymers could be used as mineral beneficiation aids such as in iron ore, phosphate, and potash recovery The polymers may also be effective in the deposit control applications when the makeup water contains soluble metal ion species, such as iron, calcium, copper, magnesium or even alum, etc.

EXAMPLES

The invention will now be further described with reference to a number of specific examples which are to be regarded solely as illustrative, and not as restricting the scope of the invention.

EXAMPLE 1

Preparation of Sodium Acrylate/AMPS®/GAE Terpolymer having a molar ratio of 6/1/1, respectively A suitable reaction flask was equipped with an addition funnel, a thermometer and an overhead stirrer 70 g of deionized water, 36 g of acrylic acid (0.5 mol), and 17.3 g of AMPS® (0.08 mol) were charged to the flask. After all the AMPS® was dissolved, 30.4 g of 50% caustic were then slowly added to the solution. External cooling was provided to maintain the temperature at 25°-40° C. After the addition, the solution was stirred for an additional 15 minutes and transferred to an addition funnel.

A separate reaction flask was equipped with a mechanical agitator, a thermometer, a reflux condenser, a nitrogen inlet and two addition inlets for the initiator and monomer solutions. The flask was charged with 120 g of deionized water, 30 g of isopropanol and 11 g of glyceryl allyl ether (GAE, 0.08 mol). The resulting solution was then heated to 85° C. under a nitrogen blanket. An initiator solution containing 21% of sodium persulfate in deionized water was prepared separately and sparged with nitrogen. The initiator solution (15 g) was then added to the reaction flask along with the mixed monomer solution containing sodium salt of acrylic acid and AMPS ® in 1 hour. After the addition, the resulting mixture was heated for 1 more hour at 85° C. and subsequently, 93 g of isopropanol/water solution was distilled off. The reaction mixture was then cooled to room temperature.

The structure of the resulting terpolymer was verified by $^{13}C$ NMR. The spectra showed broad and complex C-C peaks at 33-45 ppm and C-0 peaks at 63-72 ppm. The polymer solution, after being diluted to 25% solids with water, had a Brookfield viscosity of 18.3 cps at 25° C. It was a clear, light yellow solution. The number average molecular weight of the terpolymer was 4,000.

EXAMPLE 2

Preparation of Sodium Acrylate/AMPS ®/AHPS Terpolymer having a molar ratio of 6/1/1, respectively Utilizing the apparatus and procedure as described in Example 1, 43.2 g of acrylic acid (0.6 mol) and 20.7 g of AMPS ® (0.1 mol) were partially neutralized with 37.0 g of 50% caustic solution in 85 g of deionized water. 140 g of deionized water/23 g of isopropanol and 54.5 g of 40% sodium 3-allyloxy-2-hydroxypropane sulfonate (AHPS, 0.1 mol) were charged to a separate reaction flask. The reaction mixture was then heated to 85° C. under nitrogen atmosphere. The mixed monomer solution containing sodium salt of acryl acid and AMPS ® was then added to the reaction flask along with sodium persulfate solution in 80 minutes. The reaction mixture was heated for 1 ½ hours and subsequently 70 g of isopropanol/water solution was distilled off.

The resulting polymer solution had a Brookfield viscosity of 18.0 cps at 25% solid (25° C). It was a clear, light yellow solution. The structure of the terpolymer was also verified by $^{13}C$ NMR. No residual monomer was detected. The number average molecular weight of the polymer was close to 3,000.

DEPOSIT CONTROL ACTIVITY

The terpolymers of the present invention have been evaluated for their ability to prevent precipitation (i.e., inhibit crystallization) of calcium phosphate and calcium carbonate. The results are expressed as "percent inhibition". Positive values indicate that the stated percentage of precipitate was prevented from being formed. Except as where noted to the contrary, the following conditions were utilized to perform the inhibition tests, the results of which are reported herein in Tables I and II.

TABLE I

Calcium Phosphate Inhibition
Conditions: 600 ppm $Ca^{+2}$ as $CaCO_3$. 12 ppm $PO_4^{-3}$, pH 7.0
2 mM $NaHCO_3$, 70° C., 17 hour equilibration
% Inhibition

| Treatment | Treatment Concentrations (ppm active) | | |
|---|---|---|---|
| | 5 | 10 | 20 |
| Terpolymer | | | |
| Example 1 | 2.2 | 26.1 | 94.0 |
| Example 2 | 6.0 | 33.5 | 96.3 |
| Polyacrylic acid mw = 5,000 | 4.7 | 9.7 | 53.8 |

TABLE II

Calcium Carbonate Inhibition
Conditions: 1105 ppm $Ca^{+2}$ as $CaCO_3$, 1170 ppm $CaCO_3$, pH 9.0
70° C., 17 hour equilibration
% Inhibition

| Treatment | Treatment Concentrations (ppm active) | | |
|---|---|---|---|
| | 0.5 | 1.0 | 2.0 |
| Terpolymer | | | |
| Example 1 | 0.8 | 27.8 | 40.3 |
| Example 2 | 0.0 | 20.9 | 35.4 |
| Polyacrylic acid mw = 5,000 | 18.6 | 30.2 | 41.9 |

In order to demonstrate the effectiveness of the terpolymers of the invention in dispersing suspended particulate matter, the following procedures, using $Fe_2O_3$ and montmorillonite clay as suspended solids, were undertaken. Results appear in Tables III and IV. In the results, it is noted that increasing % T values indicate better treatment as more particles remain suspended in the aqueous medium.

TABLE III

Montmorillonite Dispersion
Conditions: 200 ppm $Ca^{+2}$ as $CaCO_3$, 1000 ppm Montmorillonite
Clay, pH 7.0, 17 hour equilibration
% Transmittance

| Treatment | Treatment Concentrations (ppm active) | | |
|---|---|---|---|
| | 5 | 10 | 20 |
| Terpolymer | | | |
| Example 1 | 29.0 | 29.0 | 30.5 |
| Example 2 | 27.5 | 29.0 | 30.8 |
| Polyacrylic acid mw = 5,000 | 20.0 | 22.5 | 26.0 |

TABLE IV

Ferric Oxide Dispersions
Conditions: 200 ppm $Ca^{+2}$ as $CaCO_3$, 300 ppm $Fe_2O_3$
10 mM $NaHCO_3$, 45° C., pH 7.0,
17 hour equilibration
% Transmittance

| Treatment | Treatment Concentrations | | |
|---|---|---|---|
| | 2.5 | 5.0 | 10.0 |
| Terpolymer | | | |
| Example 1 | 27.0 | 36.5 | 42.5 |
| Example 2 | 36.8 | 46.3 | 51.5 |
| Polyacrylic acid mw = 5,000 | 4.3 | 8.0 | 16.5 |

I claim:

1. A method of inhibiting the formation of mineral deposits including calcium phosphate, calcium carbonate, montmorillonite and ferric oxide on metallic surfaces in an aqueous system comprising adding to the aqueous system an effective amount for the purpose of a water soluble terpolymer comprises of monomeric repeat units (g), (h) and (i) having the structure:

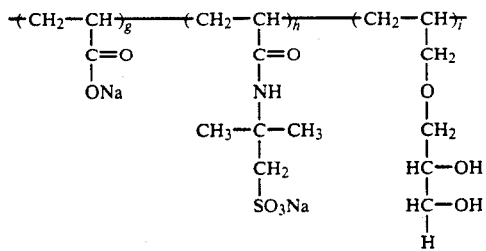

wherein the individual mole percentage of repeat units, g, h, and i is from about 5% to 95% with the proviso that the sum of the repeat units is 100%.

2. The method of claim 1 wherein the terpolymer is added to the aqueous system in an amount sufficient to maintain a concentration of about 0.1-500 parts per million parts of water.

3. The method of claim 1 wherein the concentration is from about 1.0 to 100 parts per million parts of water.

4. The method of claim 1 wherein the aqueous system is a cooling water system.

5. The method of claim 1 wherein the aqueous system is a boiler system.

6. The method of claim 1 wherein the aqueous system is a gas scrubbing system.

* * * * *